(12) United States Patent
Hesselbarth et al.

(10) Patent No.: US 9,266,775 B2
(45) Date of Patent: Feb. 23, 2016

(54) BINDER MADE OF BLAST-FURNACE SLAG

(71) Applicant: SAINT-GOBAIN WEBER, Servon (FR)

(72) Inventors: Frank Hesselbarth, Recklinghausen (DE); Udo Dudda, Bochum (DE)

(73) Assignee: SAINT-GOBAIN WEBER, Servon (FR)

( * ) Notice: Subject to any disclaimer, the term of this patent is extended or adjusted under 35 U.S.C. 154(b) by 0 days.

(21) Appl. No.: 14/415,012

(22) PCT Filed: Jul. 17, 2013

(86) PCT No.: PCT/FR2013/051722
§ 371 (c)(1),
(2) Date: Jan. 15, 2015

(87) PCT Pub. No.: WO2014/013199
PCT Pub. Date: Jan. 23, 2014

(65) Prior Publication Data
US 2015/0299037 A1 Oct. 22, 2015

(30) Foreign Application Priority Data
Jul. 19, 2012 (FR) ..................................... 12 56967

(51) Int. Cl.
*C04B 7/14* (2006.01)
*C04B 7/147* (2006.01)
*C04B 5/00* (2006.01)
*C04B 5/06* (2006.01)
*C04B 28/08* (2006.01)

(52) U.S. Cl.
CPC . *C04B 7/147* (2013.01); *C04B 5/00* (2013.01); *C04B 5/06* (2013.01); *C04B 28/08* (2013.01)

(58) Field of Classification Search
CPC ......................................................... C04B 7/14
See application file for complete search history.

(56) References Cited

FOREIGN PATENT DOCUMENTS

| DE | 1 006 327 B | 4/1957 |
|----|---|---|
| DE | 102 57 879 B3 | 2/2004 |
| JP | 52-82694 A | 7/1977 |
| JP | 54-136595 A | 10/1979 |
| JP | 63-139037 A | 6/1988 |

OTHER PUBLICATIONS

International Search Report issued Oct. 14, 2013 in PCT/FR2013/051722.
S. T. Suleimenov, et al., "Phosphorus slag-based concretes activated by complex additives" Chemical Abstracts, No. 4, XP000184484, Jul. 1981, 1 page.

*Primary Examiner* — Paul Marcantoni
(74) *Attorney, Agent, or Firm* — Oblon, McClelland, Maier & Neustadt, L.L.P.

(57) ABSTRACT

A binder for construction materials containing a ground granulated blast furnace slag and at least one mono-, di- or trivalent metal salt chosen from bismuth, copper, silver or tin salts. The salt is capable of forming, during mixing with said slag, a metal sulfide for which the solubility product $K_{SP}$, measured at 25° C., is less than $10^{-10}$.

19 Claims, No Drawings

BINDER MADE OF BLAST-FURNACE SLAG

The present invention relates to a binder used for construction materials, based on blast furnace slag, and to the process for the preparation of such a binder, to the mortar or concrete compositions comprising said binder and also to their process of preparation, and to the construction materials obtained from these compositions. The present invention also relates to a process for eliminating or reducing the smell of sulfur given off during the manufacture of construction materials based on blast furnace slags.

The majority of the environmental problems related to the production of cement relate to the manufacture of the clinker, which requires operations of decarbonation, of calcination, of clinkering and of heating, in particular at very high temperatures, of the order of 1450° C. The production of one tonne of Portland cement generates between 0.7 and 1 tonne of carbon dioxide.

Many attempts have thus been made to reduce the carbon footprint of cement and one of the solutions currently envisaged consists in using replacement starting materials based on industrial waste. It is possible to reduce the clinker content of cement by incorporating cementitious additives, such as fly ash, ground granulated blast furnace slag, silica fumes, metakaolin, pozzolanic volcanic ash or natural pozzolans, in order to manufacture compound cements, often known as blended cements. Such cements are described in particular in the standard EN197-1, which defines the specifications of 27 common cements and their constituents.

Due to a high reactivity, cements comprising blast furnace slag are particularly advantageous. Blast furnace slag is a coproduct resulting from the manufacture of cast iron from iron ore; it corresponds to the sterile gangue of the iron ore, isolated from the liquid cast iron by the difference in density. The molten slag is lighter and floats on the bath of liquid cast iron. A blast furnace slag essentially comprises silicates and, in lesser amounts, sulfides. The vitrified slag obtained by sudden cooling or quenching of the molten slag using air and/or jets of water at high pressure has a vitreous structure. This allows it to develop hydraulic properties: reference is made to granulated slag, the diameter of the particles of which is less than 5 mm. Granulated slags can be finely ground after drying and used in the cement industry. The majority of ground granulated blast furnace slags have a fineness of between 3800 and 4500 $cm^2/g$ (also expressed in Blaine units).

The CEM II/A-S cements, also known as Portland blast furnace cements, comprise from 65% to 94% by weight of clinker and from 6% to 35% by weight of ground granulated blast furnace slag. The CEM III/A-B-C cements or blast furnace cements comprise from 36% to 95% of slag and from 5% to 64% of clinker. Studies recently carried out have shown that it is possible to replace more than 95% of Portland cement with ground granulated blast furnace slag, indeed even to use this slag as binder for construction materials. Mention will be made, for example, of the patents FR-B-2 952 050 and U.S. Pat. No. 6,409,820, which describe outstanding binders based on ground granulated blast furnace slag which can be used under "mild" conditions, that is to say without requiring the use of an activating system which is highly basic and consequently dangerous to handle.

Sulfur is present in blast furnace slag and mainly in the form of sulfides since the process for the production of cast iron takes place under reducing conditions. When blast furnace slag is in contact with an acid environment, hydrogen sulfide can be released. It is well known that this sulfur-comprising compound has an unpleasant smell, reminiscent of rotten eggs, and even becomes a poison when it is present at high concentrations. The olfactory detection threshold is very low and the presence of such a gas can be detected from 0.0005 ppm, which corresponds to a few molecules per room. The lethal threshold is approximately 800 ppm. This level of concentration is never reached in construction materials. However, the smell can be uncomfortable as it is very strong and perceptible at a very low concentration.

Another known problem in construction materials due to the presence of sulfur-comprising compounds in the blast furnace slags is related to their specific color. During the hydration of the slag, its color is modified and changes from a light gray color to a blue/green color. According to the most widely accepted theories, this change would be explained by a first reaction between the sulfur-comprising compounds present in the blast furnace slag and the calcium salts present in the blast furnace slag to form calcium sulfides which, in their turn, react with iron and manganese ions present in the slag and form polysulfide complexes having an intense blue/green color. This coloration is often interpreted as being the sign of a concrete of good reactivity, of quality and of durability, due to its dense structure. This is because, as soon as these sulfides are in contact with atmospheric oxygen, they oxidize to give sulfites or sulfates, which are themselves colorless, and the discoloration irreversibly disappears. In a structure made of very dense concrete, the green coloration may remain in the core of the structure for several years, thus demonstrating a dense and airtight structure. In the majority of cases, for example for joints, mortars or components made of slag-based concrete, this discoloration is not at all troublesome. However, there exist some applications where this bluish coloration can be problematic. For example, in the case of attachment of swimming pool tiles, there always exists a risk of having excess material visible, such as, for example, pointing mortar. If the swimming pool is rapidly filled with water after having done the pointing, the process of oxidation with air may not yet be complete and the blue/green color may remain permanently visible, which may harm the esthetic appearance of the swimming pool. The same type of problem may be encountered if the formwork is removed from a freshly poured concrete and the latter is subjected too rapidly and for a long time to rain.

Patent applications WO 2012/083384 and WO 2009/144141 describe slag-based curable compositions comprising a zinc-based additive which makes it possible to improve and/or eliminate the undesirable discoloration. The presence of an alkaline activating compound is essential in these compositions. Other solutions for accelerating the elimination of the blue/green coloration have been proposed by cement producers: they consist in carrying out surface treatments with from 3% to 10% of hydrogen peroxide and bleaching agents, such as sodium hypochlorite, at concentrations varying from 3% to 6%.

However, these solutions do not make it possible to eliminate the characteristic smell due to the presence of sulfur.

There exists today a real need to find a simple solution in order to suppress or limit the problems relating to the unpleasant smells given off by binders based on ground granulated blast furnace slag and at the same time the problems related to the discoloration, when these binders are used as sole binder or as a mixture with another type of binder. It is within this context that the present invention falls.

The present invention relates to a binder for construction materials which comprises at least:
  a ground granulated blast furnace slag and
  at least one mono-, di- or trivalent metal salt chosen from
    bismuth, copper, silver or tin salts, the salt being capable of forming, during mixing with said slag, a metal sulfide for which the solubility product $K_{SP}$, measured at 25° C., is less than $10^{-10}$.

The binder according to the present invention can advantageously be composed of:
a ground granulated blast furnace slag and
at least one mono-, di- or trivalent metal salt chosen from bismuth, copper, silver or tin salts, the salt being capable of forming, during mixing with said slag, a metal sulfide for which the solubility product $K_{SP}$, measured at 25° C., is less than $10^{-10}$.

Preferably, the solubility product of the metal sulfide $K_{SP}$, measured at 25° C., is less than $10^{-20}$.

The addition of a metal salt as described above advantageously makes it possible to significantly reduce the smell of sulfur and also to limit the problems of discoloration encountered with this type of binder based on blast furnace slag.

The metal salt, when it is brought into the presence of the binder based on blast furnace slag, reacts with the sulfur-comprising compounds present to form a sulfide complex, which will precipitate and remain in the solid form. The fact that the product obtained has very little solubility makes it possible to trap, in solid form, the compounds responsible for the unpleasant smell.

The solubility of a compound is characterized by a solubility product, denoted $K_{sp}$, which is the equilibrium constant of the reaction corresponding to the dissolution of a solid in a solvent.

The dissolution of a solid of formula $A_aB_b$ is described by the following reaction:

$$A_aB_b(\text{solid}) \rightleftharpoons aA^{b+}(\text{aqueous}) + bB^{a-}(\text{aqueous})$$

As the compound $A_aB_b$ is solid, its activity coefficient is equal to 1 and the activities of the ions in an aqueous medium are in the same category as their concentrations in mol/l.

The solubility product $K_{sp}$ is thus defined in the following way:

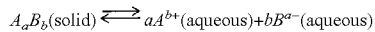

$$K_{sp} = [A^{b+}]^a \cdot [B^{a-}]^b$$

The solubility products of various sulfides, measured at 25° C., are given by way of example in the table below (table 1).

| Sulfides | Solubility product, measured at 25° C. |
|---|---|
| $Bi_2S_3$ | $1.6 \cdot 10^{-72}$ |
| CdS | $1.0 \cdot 10^{-28}$ |
| CoS | $5 \cdot 10^{-22}$ |
| CuS | $8 \cdot 10^{-37}$ |
| FeS | $4 \cdot 10^{-19}$ |
| PbS | $7 \cdot 10^{-29}$ |
| MnS | $7 \cdot 10^{-16}$ |
| HgS | $1.6 \cdot 10^{-54}$ |
| NiS | $3 \cdot 10^{-21}$ |
| $Ag_2S$ | $5.5 \cdot 10^{-51}$ |
| SnS | $1 \cdot 10^{-26}$ |
| ZnS | $2.5 \cdot 10^{-22}$ |

This table gives the solubility product values of the simple sulfide compounds; however, the orders of magnitude of the solubility products of the polysulfide compounds should remain the same.

Surprisingly, the inventors of the present invention have found that, by adding certain metal salts, the corresponding polysulfide compounds of which formed by reaction with the blast furnace slag have very little solubility in water, which is characterized by very low solubility product values, it is possible to considerably reduce the smell characteristic of hydrogen sulfide and simultaneously to limit the discoloration of the products comprising this type of slag.

The metals such as bismuth, copper, mercury and silver have been shown to be particularly effective. However, for reasons of toxicity, mercury is not selected.

The amount of metal salt represents between 0.02% and 10% by weight of the amount of slag, preferably between 0.05% and 5% by weight.

It is apparent that a quite low amount of metal salt is necessary to significantly reduce the unpleasant smell.

By slightly increasing the amount of salt, it is possible to reduce the olfactory problem and at the same time prevent the problems of discoloration.

The metal salt used is a sulfate, a nitrate, a chloride, a carbonate or a hydroxide.

It can be in the solid form or in the form of an aqueous solution.

Another subject matter of the present invention is a process for the preparation of a binder as described above.

According to a first embodiment, when the metal salt is in the solid form, the process comprises a stage of grinding the vitrified blast furnace slag which makes it possible to obtain the ground granulated slag, the addition of a mono-, di- or trivalent metal salt chosen from bismuth, copper, silver, tin or barium salts being carried out during or after said grinding stage.

According to a second embodiment, when the metal salt is in the solid form, it can be mixed with the molten slag exiting from the blast furnace; the mixture obtained is subsequently solidified by quenching and then ground.

According to yet another embodiment, the metal salt in the form of an aqueous solution is mixed with a stream of water used for the quenching of the molten slag exiting from the blast furnace, the product obtained, solidified, subsequently being ground.

The present invention also relates to a process for the elimination or reduction of the smell of sulfur given off during the manufacture of construction materials based on blast furnace slags, in which the binder employed for the manufacture of said materials is the binder described above or prepared according to the process described.

The present invention also relates to a concrete or mortar composition comprising at least:
a binder based on ground granulated blast furnace slag,
a mono-, di- or trivalent metal salt chosen from bismuth, copper, silver or tin salts,
aggregates, fillers and/or sands.

The concrete or mortar composition can comprise one or more other hydraulic binders mixed with the binder based on ground granulated blast furnace slag.

The amount of metal salt present in the composition varies between 0.02% and 10% by weight, with respect to the amount of slag-based binder, preferably between 0.05% and 5% by weight and more preferably still between 0.2% and 0.5% by weight.

The composition can additionally comprise an activator, that is to say a system comprising at least one compound intended to improve the setting and/or the curing of the binder. The activator is chosen from alkaline activators, such as slaked lime, sodium hydroxide, potassium hydroxide, sodium silicate or potassium silicate, activators of sulfate type, such as calcium sulfate, and/or activators based on slag microparticles. Preferably, the activator will be chosen from activators of sulfate type, such as calcium sulfate, and/or activators based on slag microparticles. This is because these types of activator are less dangerous to handle and make it possible to operate under mild conditions. The content of activating agent can vary between 1% and 10% by weight, with respect to the total weight of the composition.

The composition can also comprise additives conferring specific properties. Mention will be made, for example, of rheological agents, water-retaining agents, air-entraining agents, thickening agents, biocidal protecting agents, dispersing agents, pigments, accelerators and/or retarders, or polymeric resins. The content of additives can vary between 0.1% and 10% by weight, with respect to the total weight of the composition.

Advantageously, the ratio by weight of the amount of slag to the amount of hydraulic binder in the mortar or concrete composition according to the present invention varies between 20/80 and 100/0.

The hydraulic binder is a Portland cement, a high-alumina cement, a sulfoaluminate cement, a belite cement or a cement formed of pozzolanic mixtures optionally comprising fly ash, fumed silicas, limestone, calcined schiste and/or natural or calcined pozzolans.

The composition comprises aggregates, fillers and/or sands and reference is then commonly made to mortar or concrete depending on the size of the aggregates. These compounds in particular alter the rheology, the hardness or the final appearance of the product. They are generally formed of sands based on silica, limestone and/or silica/limestone. The fillers are limestone or silica components. The content of such aggregates, fillers and/or sands in the composition can range up to 90% by weight and is preferably between 20% and 80% by weight, with respect to the total weight of the composition, and more preferably still between 50% and 70% by weight.

The present invention also relates to the process for the preparation of a concrete or mortar composition as described above.

According to a first embodiment, the process comprises a stage of preparation of the binder based on ground granulated blast furnace slag according to the preparation process described above and then a stage of mixing said binder with aggregates, sands and/or fillers and optionally with one or more hydraulic binders, activators and additives. Thus, the slag-based binder is prepared with the metal salt before being mixed with the other constituents of the mortar or concrete composition.

According to another embodiment, it is possible to envisage adding the metal salt directly during the preparation of the mortar or concrete composition. In this case, the preparation process comprises a stage of mixing the ground granulated blast furnace slag with the sand, the aggregates and/or the fillers, if appropriate with the hydraulic binder, the additives and/or the activator, the metal salt in the solid form being added during the mixing stage.

According to another embodiment, the process for the preparation of the mortar or cement composition comprises a stage of preparation of a ready-for-use mortar or concrete, which consists in mixing the ground granulated blast furnace slag with the sand, the aggregates and/or the fillers, if appropriate with the hydraulic binder, the additives and/or the activator, and then a stage of mixing with water, the metal salt being added during or after the mixing stage.

Advantageously, the metal salt, when it is present in aqueous solution, is mixed with the liquid additives present in the mortar or cement composition or with the mixing water.

Another subject matter of the present invention is construction materials, such as concrete, building blocks, sheets, coatings, tiling adhesives, screeds or floors obtained from the composition described above or prepared by the process described.

The bismuth, copper, mercury and silver salts are particularly preferred in the implementation of this process. The amount of metal salt represents between 0.02% and 10% by weight of the amount of slag. Preferably, the amount of salt is between 0.05% and 5% by weight.

It is thus possible to notably reduce the unpleasant smell of sulfur. The metal salts are chosen from the sulfates, nitrates, chlorides, carbonates or hydroxides.

EXAMPLES

Tests were carried out on two different mortar compositions comprising, as binder:
  a mixture of 95% by weight of ground granulated blast furnace slag and 5% of Portland cement, or
  a mixture of 50% by weight of ground granulated blast furnace slag and 50% by weight of Portland cement.

Different metal salts were added to these compositions, during the mixing of these binders with the other constituents of the mortar composition.

The following salts were tested: bismuth sulfate, copper sulfate, copper nitrate, silver nitrate and tin sulfate.

The results have shown that the reduction in smell is notable as soon as a metered amount of 0.05% of metal salt, with respect to the amount of ground granulated blast furnace slag, is present in the mortar compositions. The effectiveness of the salts can be categorized in the following way: $Bi_2(SO_4)_3 > CuSO_4 - CuNO_3 > AgNO_3 > SnSO_4$ The solubility products of the bismuth, copper, silver and tin polysulfides are less than $10^{-10}$.

The equivalent results obtained with the two copper salts show that the counterion (respectively sulfate or nitrate) has no influence on the effect observed.

By way of comparison, copper sulfate was added in anhydrous form, on the one hand, and in the pentahydrate form, on the other hand. No difference was observed for these different forms: the effect on the smell remains identical.

The best results in terms of effectiveness were obtained when bismuth or copper metal salts were added in amounts varying between 0.1% and 0.5% by weight, with respect to the ground granulated blast furnace slag.

When amounts of greater than 0.5% are added, it is noted that the effect on the smell is no longer improved but these amounts make it possible to limit the problems of blue/green discoloration which may conventionally be observed during the hydration of the ground granulated blast furnace slag.

The compositions formed of mortars comprising the metal salts were stored, either immediately or after one or more days under water, which prevents oxidation, and their colors were observed and compared with a reference sample devoid of metal salts.

The salts tested can be categorized, in terms of effectiveness in preventing discoloration, in the following way: $Bi_2(SO_4)_3 - CuSO_4 - CuNO_3 - Cu(OH)_2 > SnSO_4$ The results obtained have shown that the bismuth salts and the copper salts are highly effective, even for applications under water, when the amount of salts introduced varies between 2% and 5% by weight with respect to the weight of ground granulated blast furnace slag.

The invention claimed is:
1. A binder comprising:
a ground granulated blast furnace slag and
at least one mono-, di- or trivalent metal salt selected from the group consisting of bismuth, copper, silver and tin salts, wherein the salt is capable of forming, during mixing with said slag, a metal sulfide for which the solubility product $K_{SP}$, measured at 25° C., is less than $10^{10}$.

2. The binder as claimed in claim 1, wherein the solubility product of the metal sulfide $K_{SP}$, measured at 25° C., is less than $10^{-20}$.

3. The binder as claimed in claim 1, wherein the amount of metal salt is between 0.02% and 10% by weight of the amount of slag.

4. The binder as claimed in claim 1, wherein the metal salt is at least one selected from the group consisting of bismuth, copper and silver salts.

5. The binder as claimed in claim 1, wherein the metal salt is a sulfate, a nitrate, a chloride, a carbonate or a hydroxide.

6. The binder as claimed in claim 1, wherein the metal salt is in a solid form or in the form of an aqueous solution.

7. A process for the preparation of the binder as claimed in claim 1, the process comprising
grinding a vitrified blast furnace slag to obtain the ground granulated slag
adding at least one mono-, di- or trivalent metal salt selected from the group consisting of bismuth, copper, silver and tin salts, wherein the adding is carried out during or after said grinding.

8. A process for the preparation of the binder as claimed in claim 1, the process comprising
mixing the metal salt in the form of a solid with a molten slag exiting from a blast furnace,
quenching the mixture to obtain a solid and grinding the solid.

9. A process for the preparation of the binder as claimed in claim 1, the process comprising
mixing the metal salt in the form of an aqueous solution with a stream of water
quenching a molten slag exiting from a blast furnace with the metal salt solution to yield a product,
solidifying the product to obtain a solid, and grinding the solid.

10. The process of claim 8, which eliminates or reduces the smell of sulfur from blast furnace slags.

11. A concrete or mortar composition, comprising:
a binder comprising a ground granulated blast furnace slag,
at least one mono-, di- or trivalent metal salt selected from the group consisting of bismuth, copper, silver and tin salts, and
at least one selected from the group consisting of sand, an aggregate and a filler.

12. The concrete or mortar composition as claimed in claim 11, further comprising a hydraulic binder mixed with the binder comprising the ground granulated blast furnace slag, wherein the ratio by weight of the amount of slag to the amount of hydraulic binder is between 20/80 and 100/0.

13. The concrete or mortar composition as claimed in claim 11, further comprising at least one activator selected from the group consisting of an alkaline activator, an activator of sulfate type, and an activator comprising slag microparticles.

14. The concrete or mortar composition as claimed in claim 11, further comprising at least one additive selected from the group consisting of a rheological agent, a water-retaining agent, an air-entraining agent, a thickening agent, a biocidal protecting agent, a dispersing agent, a pigment, an accelerator and/or a retarder, and a polymeric resin.

15. The concrete or mortar composition as claimed in claim 12, wherein the hydraulic binder is a Portland cement, a high-alumina cement, a sulfoaluminate cement, a belite cement or a cement formed of a pozzolanic mixture optionally comprising at least one selected from the group consisting of fly ash, a fumed silica, limestone, calcined schiste and a natural or calcined pozzolan.

16. A process for the preparation of the concrete or mortar composition as claimed in claim 11, comprising
grinding a vitrified blast furnace slag to obtain a ground granulated slag,
adding at least one mono-, di- or trivalent metal salt selected from the group consisting of bismuth, copper, silver and tin salts, wherein the adding is carried out during or after said grinding to yield a binder,
mixing said binder with the aggregate, sand, filler, or mixtures thereof and optionally with at least one selected from the group consisting of a hydraulic binder, an activator and an additive.

17. A process for the preparation of the concrete or mortar composition as claimed in claim 11, comprising
mixing the ground granulated blast furnace slag with the aggregate, filler, sand, or mixtures thereof and optionally with at least one selected from the group consisting of a hydraulic binder, an activator and an additive,
adding the metal salt, in a solid form, during the mixing.

18. A process for the preparation of the concrete or mortar composition as claimed in claim 11, comprising
mixing the ground granulated blast furnace slag with the aggregate, filler, sand, or mixtures thereof and optionally with at least one selected from the group consisting of a hydraulic binder, an activator and an additive,
mixing with water,
adding the metal salt during or after the mixing with water.

19. A construction material, comprising the mortar or concrete composition as claimed in claim 11.

* * * * *